(12) United States Patent
Ma et al.

(10) Patent No.: US 6,745,700 B2
(45) Date of Patent: Jun. 8, 2004

(54) RADIAL BOGIE WITH STEERING BEAM MOUNT UNITIZED BRAKE

(75) Inventors: Xiaoying Ma, Itasca, IL (US); Hans-Dieter Schaller, La Grange, IL (US); David Jason Goding, Palos Park, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/172,783

(22) Filed: Jun. 14, 2002

(65) Prior Publication Data

US 2003/0230212 A1 Dec. 18, 2003

(51) Int. Cl.[7] .................................................. B61D 1/00
(52) U.S. Cl. ...................................... 105/166; 105/34.1

(58) Field of Search ................................ 105/165, 166, 105/167, 168, 182.1, 183

(56) References Cited

U.S. PATENT DOCUMENTS

| 4,417,525 | A | * | 11/1983 | Levy ........................... 105/166 |
| 4,765,250 | A | * | 8/1988 | Goding ....................... 105/166 |
| 5,375,533 | A | * | 12/1994 | Schwendt ................... 105/166 |
| 5,613,444 | A | * | 3/1997 | Ahmadian et al. .......... 105/166 |

* cited by examiner

Primary Examiner—S. Joseph Morano
Assistant Examiner—Robert J. McCarry, Jr.
(74) Attorney, Agent, or Firm—Cary W. Brooks

(57) ABSTRACT

An arrangement for self-steering, radial bogie, truck or vehicle frame for locomotives and other railroad vehicles, which mount unitized brakes to steering beams located either ahead and/or behind their respective leading and trailing wheelsets.

31 Claims, 4 Drawing Sheets

RADIAL BOGIE WITH STEERING BEAM MOUNT UNITIZED BRAKE

TECHNICAL FIELD

The present invention relates generally to railroad vehicles and particularly to steering railroad trucks or radial bogies having unitized brakes.

BACKGROUND OF THE INVENTION

Generally, unitized brakes have very limited brake shoe stroke due to the nature of their design. The limited brake shoe stroke available from unitized brakes makes it more difficult to apply unitized brakes on radial bogies than on non-radial bogies, since greater brake shoe stroke or a special mechanism is required to compensate the variation of the clearance between the brake shoe and wheel due to the wheelset steering. Due to the steering function of radial bogies, a bogie frame-mounted unitized brake generally need about 20 mm of extra shoe clearance, a difficult requirement to meet with existing prior art bogie designs. The present inventors have recognized a need for improvements in radial bogie design.

SUMMARY OF THE INVENTION

The present invention meets the above-mentioned need by providing a railroad truck or bogie with two or more powered or unpowered wheelsets and unitized brakes mounted on steering beams for leading and trailing wheelsets. The steering beam-mounted unitized brake of the present invention is guided with the wheel. The present invention further includes for each brake a hanger bracket that is attached on the bogie's side frame to carry the vertical shoe reaction force.

Although the present invention is not limited to specific advantages or functionality, it is noted that since the steering beam-mounted unitized brake will be guided with the wheel, extra shoe clearance is not required. Additionally, for each brake, since the hanger bracket carries the vertical shoe reaction force to the bogie frame, the steering beam is not loaded in torsion, thereby reducing total steering beam loading and wear.

In one embodiment, provided is a radial bogie for rail vehicles comprising a frame having longitudinally extending side frames laterally spaced by transoms, the side frames defining a longitudinal axis and having leading and trailing ends. Included are leading and trailing wheelsets with axles supported on the frame, and first and second steering beams for pivotally guiding the wheelsets. The first steering beam is pivotally mounted on the frame behind the leading wheelset away from the leading end of the frame, and the second steering beam is pivotally mounted on the frame behind the trailing wheelset toward the trailing end of the frame. Traction links are connected between the wheelsets and the steering beams, and an inter-axle linkage is connected between the steering beams. Unitized brakes are mounted on the first and second steering beams.

In another embodiment, provided is a radial bogie for rail vehicles comprising a frame having longitudinally extending side frames laterally spaced by transoms, the side frames having side posts and defining a longitudinal axis. Included are two end wheelsets with axles supported on the frame, the two end wheelsets being pivotally mounted on the frame, and a center wheelset with an axle supported on the frame between the two end wheelsets. The center wheelset is substantially unpivotably connected to the side posts by traction links and is movable laterally to the longitudinal axis. Included also are steering beams for pivotally guiding the end wheelsets, each one of the steering beams is pivotally mounted on the frame behind a respective one of the end wheelsets, additional traction links connected between the end wheelsets and the steering beams, and an inter-axle linkage connected between the steering beams. A first set of unitized brakes is mounted to the steering beams.

In still another embodiment, provided is a radial bogie for rail vehicles comprising a frame having side posts, a leading end, and defining a longitudinal axis, and including first, second and third wheelsets having axles being elastically supported on the frame, and a pair of steering beams, one each located behind the first and third wheelsets away from the leading end of the frame and mounting a first set of unitized brakes. The radial bogie includes a second set of unitized brakes for braking the second wheelset. Traction links couple the first and third wheelsets to the steering beams and the second wheelset to the frame. Included also is an inter-axle link coupling rotary motions about vertical axes of the steering beams to provide opposite transverse movement of the first and third wheelsets upon traversing curves, wherein each of the first set of unitized brakes includes an active lever and a brake shoe pivotally connected to a hanger, the active lever being connected to the brake shoe, and the hanger being pivotally connected to the frame, and wherein each of the second set of unitized brakes includes an active lever and a brake shoe pivotally connected to a hanger, the active lever being connected to the brake shoe, and the hanger being pivotally connected to a respective one of the side posts.

In still yet another embodiment, provided is a railroad locomotive of the type comprising a carbody supported by at least one self-steering radial bogie having a frame having longitudinally extending side frames laterally spaced by transoms, the side frames defining a longitudinal axis and having leading and trailing ends. Included are leading and trailing driven wheelsets with axles supported on the frame, and first and second steering beams for pivotally guiding the wheelsets. The first steering beam is pivotally mounted on the frame behind the leading wheelset away from the leading end of the frame, and the second steering beam is pivotally mounted on the frame behind the trailing wheelset toward the trailing end of the frame. Traction links are connected between the wheelsets and the steering beams, and an inter-axle linkage is connected between the steering beams. Unitized brakes are mounted on the steering beams.

In still another embodiment, provided is running gear for rail vehicles comprising at least one bogie having a frame having longitudinally extending side frames laterally spaced by transoms, the side frames defining a longitudinal axis and having leading and trailing ends. Leading and trailing wheelsets with axles are supported on the frame. Included are first and second steering beams for pivotally guiding the wheelsets. The first steering beam is pivotally mounted on the frame behind the leading wheelset away from the leading end of the frame, and the second steering beam is pivotally mounted on the frame behind the trailing wheelset toward the trailing end of the frame. Traction links are connected between the wheelsets and the steering beams, and an inter-axle linkage is connected between the steering beams. Unitized brakes are mounted on the steering beams.

These and other features and advantages of the invention will be more fully understood from the following description of a preferred embodiment of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

DESCRIPTION OF THE PREFERRED EMBODIMENT

Figure 1:
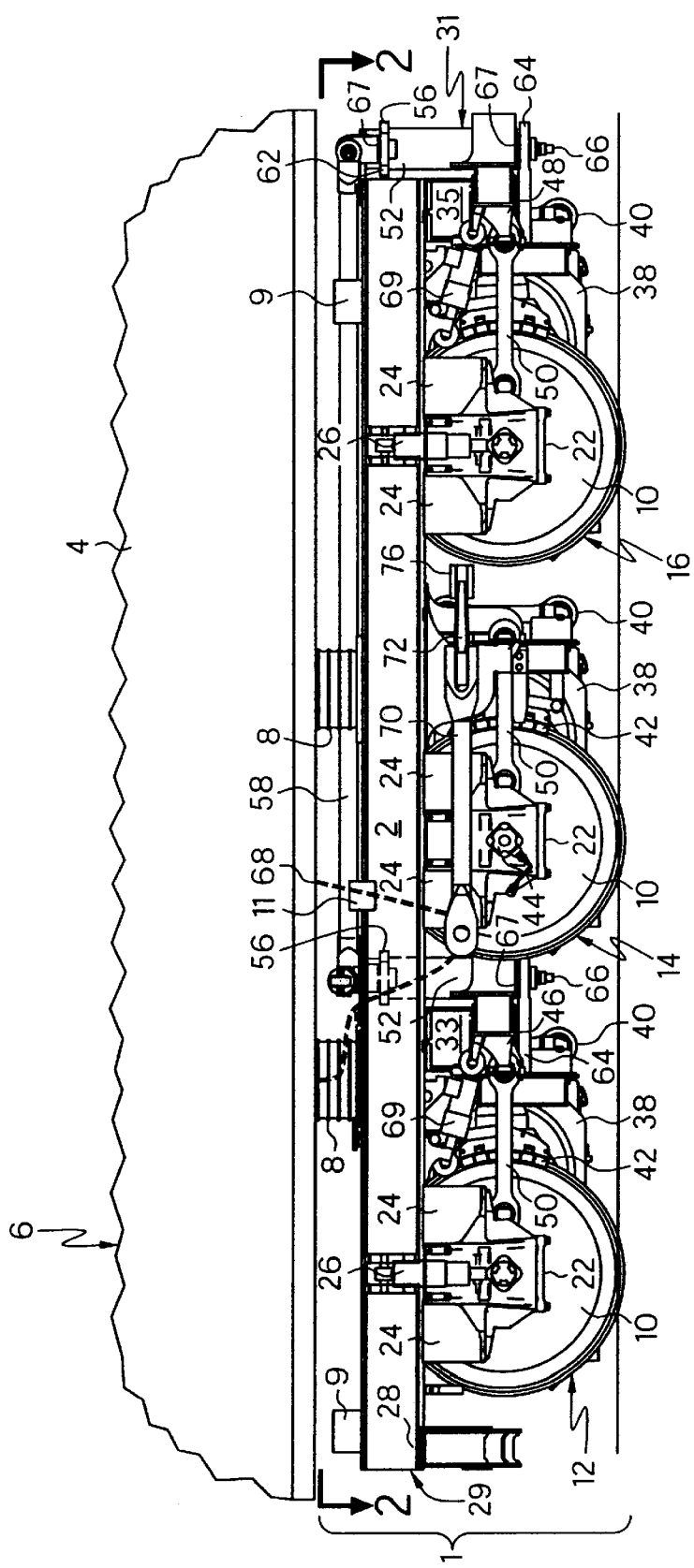
FIG. 1 is a fragmentary, diagrammatic, side-elevational view of a running gear for rail vehicles with radial adjustability having a construction of an inter-axle rod interconnecting steering beams located behind leading and trailing wheelsets, with some parts being shown in phantom and other parts removed for conveniences of illustration.
Figure 2:
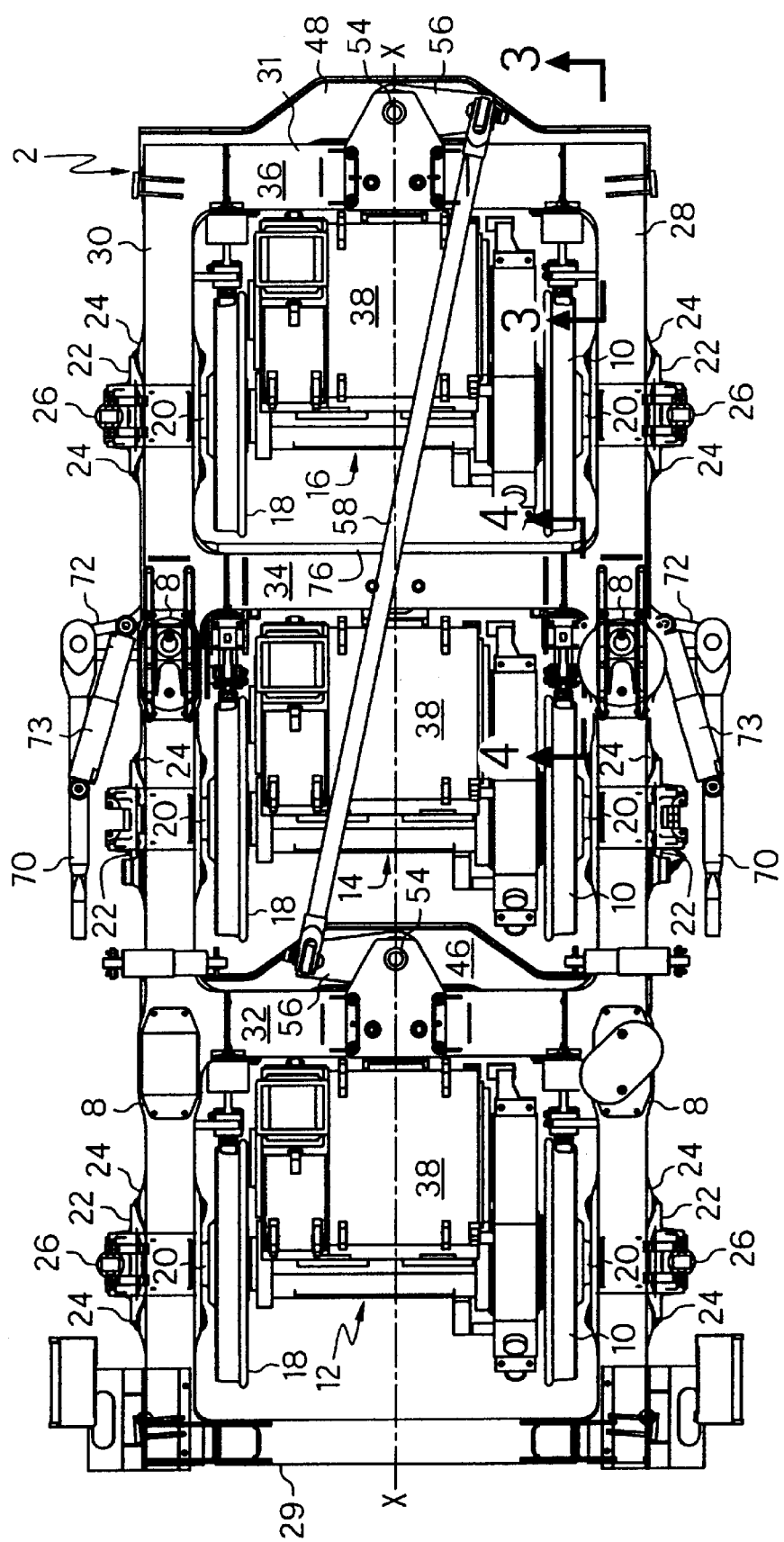
FIG. 2 is a diagrammatic, top-plan view of a running gear for rail vehicles, with some parts being shown in phantom and other parts removed for conveniences of illustration, and three driven wheelsets in the "straight-ahead" position.

The invention may be embodied in rail trucks or bogies having at least two or more axles, and can be used with both locomotives and non-driven railroad vehicles. The invention is concerned with the mounting of unitized brakes that for purposes of the invention in themselves may be of any conventional type. Referring now more specifically to FIGS. 1 and 2, there is seen an embodiment of a running gear or undercarriage, generally indicated as 1, for a railroad vehicle with radial adjustability having a construction of at least two steering beams located behind their respective wheelsets, unitized brakes mounted on each steering beam, and an inter-axle linkage or guide rod interconnecting the rotation of the steering beams of the leading and trailing wheelsets. In other embodiments, the braking arrangement may be used on bogies having a steering beam in front of the trailing wheelset, such as disclosed by commonly assigned U.S. Pat. Nos. 4,628,824; 4,679,506; 4,765,250; 4,841,873; 5,613,44; and 5,746,135, which disclosures are herein incorporated fully by reference. The terms leading and trailing are used for descriptive purposes only as the bogie may be operated equally well in either direction of operation.

A truck frame or bogie 2 elastically supports a carbody 4 of a railroad vehicle, generally indicated by numeral 6. In one embodiment, the railroad vehicle 6 is a self-powered railroad locomotive having the carbody 4 supported by at least two motorized self-steering railroad bogies 2 (only one of which is shown) having two or more wheelsets. In another embodiment, the railroad vehicle 6 may be an unpowered railroad car having the carbody 4 supported by at least two or more self-steering railroad bogies 2 having two or more wheelsets.

Spring elements 8 are provided along the top of the bogie to provide suspension and support for the carbody 4. The spring elements 8, which could be replaced by any other suitable resilient suspension means, are made stiff in compression to provide a relatively hard secondary suspension between the truck frame and carbody. The spring elements 8 yield more freely in sheer to permit limited lateral motion as well as yawing motion of the bogie relative to the carbody 4 during normal curve negotiation. Carbody stops 9, provided also along the top of the bogie, are arranged to engage inner portions of the carbody 4 to limit the amount of yaw carbody motion as required. Additionally, lateral stops 11 are provided on the bogie 2 to limit the amount of lateral carbody motion as required.

In the illustrated embodiment, elastically suspended from the bogie 2 are a first wheelset 12, a second wheelset 14, and a third wheelset 16. Each wheelset 12, 14, and 16 comprises a first rail engageable wheel 10 and a second rail engageable wheel 18. Left and right wheels 10 and 18 of each wheelset 12, 14, and 16 are supported by an axle 20 and are generally parallel and laterally spaced from each other. Additionally, the wheelsets 12, 14, and 16 are also laterally spaced to form longitudinally spaced wheel and axle assemblies. A bearing housing 22 rotatably supports each end of the axle 20 and elastically supports the bogie 2 through wheelset spring elements 24.

The bearing housing 22 may be either a one-piece or a two-piece design. In the one-piece design, the bearing housing 22 is a single piece that encloses the bearing assembly totally (note shown). In the two-piece design, the bearing housing 22 includes upper and lower housing parts. The upper housing provides the interface to the bearing assembly and transfers vertical and horizontal loads. The lower part, or bearing cap/retainer, provides the means of lifting the wheelset with the bearing house and adds structural strength to the whole assembly.

The wheelset spring elements 24 allow limited relative motion of the wheelsets 12, 14, and 16 with their bearing housings 22 while resiliently urging the housings and their wheel and axle assemblies into nominally centered non-curving longitudinally aligned positions, as is illustrated in FIG. 2. A wheelset-damping element 26 may also be provided between the bogie 2 and each bearing housing 22 for further suspension.

The bogie 2 may be a unitary or assembled/joined frame, and fabricated, cast, or otherwise manufactured. In particular, the bogie 2 includes a pair of generally parallel laterally spaced longitudinally extending side frames 28 and 30. The side frames 28 and 30 define a longitudinal axis x, which extends equal distantly therebetween, and have leading and trailing ends 29 and 31. Side frames 28 and 30 are interconnected by longitudinally spaced transversely extending transoms, which in the illustrated embodiment are transoms 32, 34, and 36. A pair of posts 33 and 35 depend from center and trailing transom 34 and 36, respectively, only one of each pair being shown.

For powering the wheelsets to drive the locomotive embodiment, the bogie 2 is then provided with at least two traction motors 38, one driving each axle 20. Each motor is supported by a conventional bearing arrangement on its respective axle, and is carried from one of the adjacent transoms, via a nose link 40 and/or mounting, to respective post 33 or 35. Each nose link 40 is flexibly or swively connected at its ends to allow a limited amount of both longitudinal and lateral motion between the traction motor 38 and the adjacent transom by which it is supported.

To provide for limited self-steering action of the wheelsets while transmitting traction and braking forces between the wheel and axle assemblies and the bogie frame, the bogie 2 is provided with a traction linkage formed in accordance with the invention disclosed by commonly assigned and co-pending patent application Ser. No. 10/172, 806, the disclosure of which is herein incorporated fully by reference. In the illustrated embodiment, this traction linkage includes laterally extending leading and trailing steering beams 46 and 48, respectively, which are pivotally connected at their centers with the bottoms of adjacent transoms 32 and 36, respectively. The steering beams 46 and 48 allow the rotation of the end wheelsets relative to the bogie frame.

Laterally opposite ends of the leading and trailing steering beams 46 and 48, respectively, are connected with the bearing housings 22 of the leading and trailing wheelsets 12 and 16 by traction links 50. The steering beams 46 and 48 are attached to upstanding torque tubes 52 which extend vertically upward about a pivot axes 54 of the steering beams and connect, at their upper ends, with a respective one of a pair of crank arms 56. These crank arms 56 extend in laterally opposite directions. The ends of the crank arms 56 are interconnected by an inter-axle link 58 which extends diagonally therebetween over the wheelsets 14 and 16 and the transom 34.

To support the leading and trailing steering beams 46 and 48 with their associated torque tubes 52 and crank arms 56, the adjacent transoms 32 and 36 are provided with upper pivot plates 62. At the ends of each pair of posts 33 and 35 provided is a lower pivot plate 64, such that the upper and lower pivot plates carrying through bolts 66. Bolting arrangement 66 secure bushings 67 on which the torque tubes 52 are pivotally mounted.

The steering beams 46 and 48, traction links 50, cranks 56, and inter-axle link 58 are so arranged as to require equal and opposite yawing (steering) motions of the leading and trailing wheelsets 12 and 16, respectively, so as to provide efficient inter-related self-steering actions of the end axles. These components comprise a first force-transmitting linkage which carries the traction and braking forces between the wheelsets and the bogie frame, as well as allowing equal and opposite self-steering of the end wheelsets 12 and 16.

In one embodiment, a pair of yaw dampers 69 is connected to each steering beam 46 and 48 and the bogie frame, only one of each pair shown by FIG. 1. The yaw dampers 69 are provided for good steering efficiency and high stability by controlling the rotation of the end wheelsets 12 and 16. Since only the relative motion between the steering beam and the bogie frame is rotation around the vertical axis, this damper location ensures that only the steering mode is damped, and reduces the angular loading of the damper bushings.

The bogie 2 may further be provided with a second force-transmitting linkage, which pivotably connects the bogie 2 with the carbody 4 to provide for the transfer of traction and braking forces therebetween. The second force-transmitting linkage, or carbody linkage, includes a pair of carbody side posts 68 that depends from the carbody 4, which only one is shown in dashed lines for ease of illustration in FIG. 1. Connected to each respective side post 68 is a side rod 70, which is connected to a respective bell crank 72. Additionally, dampers 73 may further be connected to the side posts 68 (FIG. 2).

Each of the bell cranks 72 pivots on a respective carbody linkage support 74 which depend from respective side frames 28 and 30, only one of which is shown in FIG. 1. Each carbody linkage support 74 also has attached traction links 50 of the center wheelset 14. It is to be appreciated that each traction link 50 attaches between a respective end of the center wheelset 14 and a respective carbody linkage support 74, and does not connect to the bell crank 72 supported by the same support 74. A cross link 76 pivotably interconnects a first end of each bell crank 72. Accordingly, the center wheelset 14 is substantially unpivotably mounted on the bogie 2, but is movable laterally to the longitudinal axis x, which extends through the midsection of the bogie 2. In this arrangement, the carbody linkage allows the transfer of longitudinal loads (due to tractive effort and braking loads) between the bogie 2 and carbody 4, while allowing the bogie to rotate in curves and to move in the lateral direction.

Interconnection of the leading and trailing wheelsets 12 and 16, respectively, through steering beams 46 and 48, by means of the torque tubes 52, crank arms 56, and inter-axle link 58 provides the desired steering interconnection of the end wheelsets. If the running gear 1 enters a curve, then the leading wheelset 12 is displaced by the geometry of the curve toward the outside of the curve, relative to the center of the running gear located in the cord position. Due to coupling of the leading and trailing wheelsets 12 and 16, via use of the inter-axle link 58, the trailing wheelset 16 is displaced toward the inside of the curve, counter to the leading wheelset 12. This movement is because the inter-axle link 58 is pushed by the pivoting of pivoted crank arm 56 of the leading wheelset 12 about its pivot point 54.

At the same time, the aforementioned pivoting motion generates an opposite pivoting motion of the crank arm 56 of the trailing wheelset 56 about its pivot point 56, causing displacement of the trailing wheelset 16 in the longitudinal direction. This displacement acts in opposite directions at the right and the left of the running gear, and thus adjusts the axle of the trailing wheelset 16 to a virtually radial position oriented approximately toward the center of the curve. Additionally, small deviations occur in the location of the center wheelset 14 perpendicular to the longitudinal axis of the running gear.

Those skilled in the art will recognize that the present bogie arrangements may further include additional components and/or arrangements, such as speed recorder 78, other additional suspension members such as, for example, secondary lateral and yaw dampers, lateral and yaw stops, pitching stops and dampers, and components such as, for example, sand boxes and steps, air ducts, fuel tanks, air reservoirs, diagonal girders, and additional transoms. Such components and others are further disclosed by commonly assigned U.S. Pat. Nos. 4,628,824; 4,679,506; 4,765,25; 4,841,873; 5,613,44; and 5,746,135.

Figure 3:
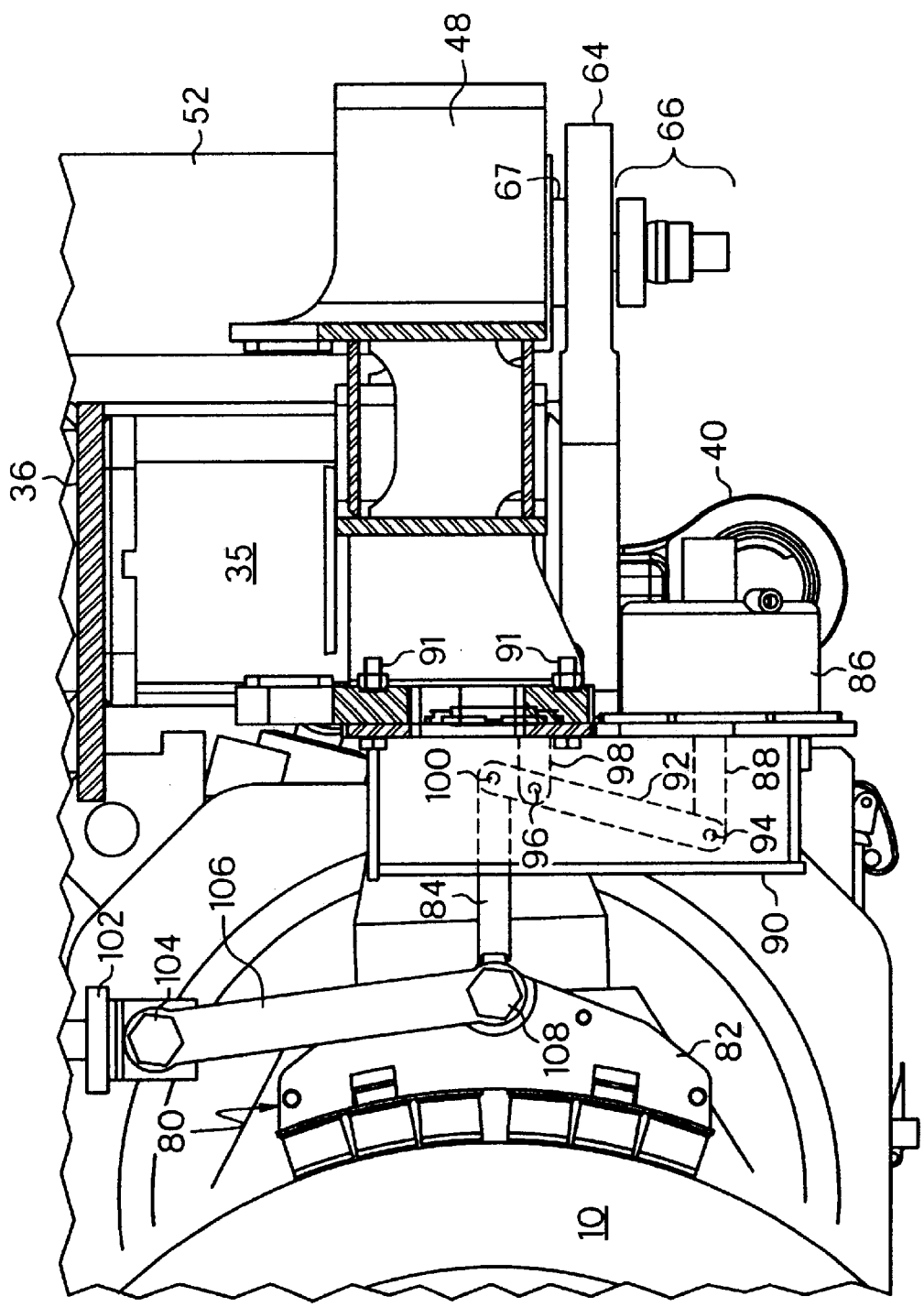
FIG. 3 is a fragmental cross-sectional view taken substantially along line 3—3 of FIG. 2.
Figure 4:
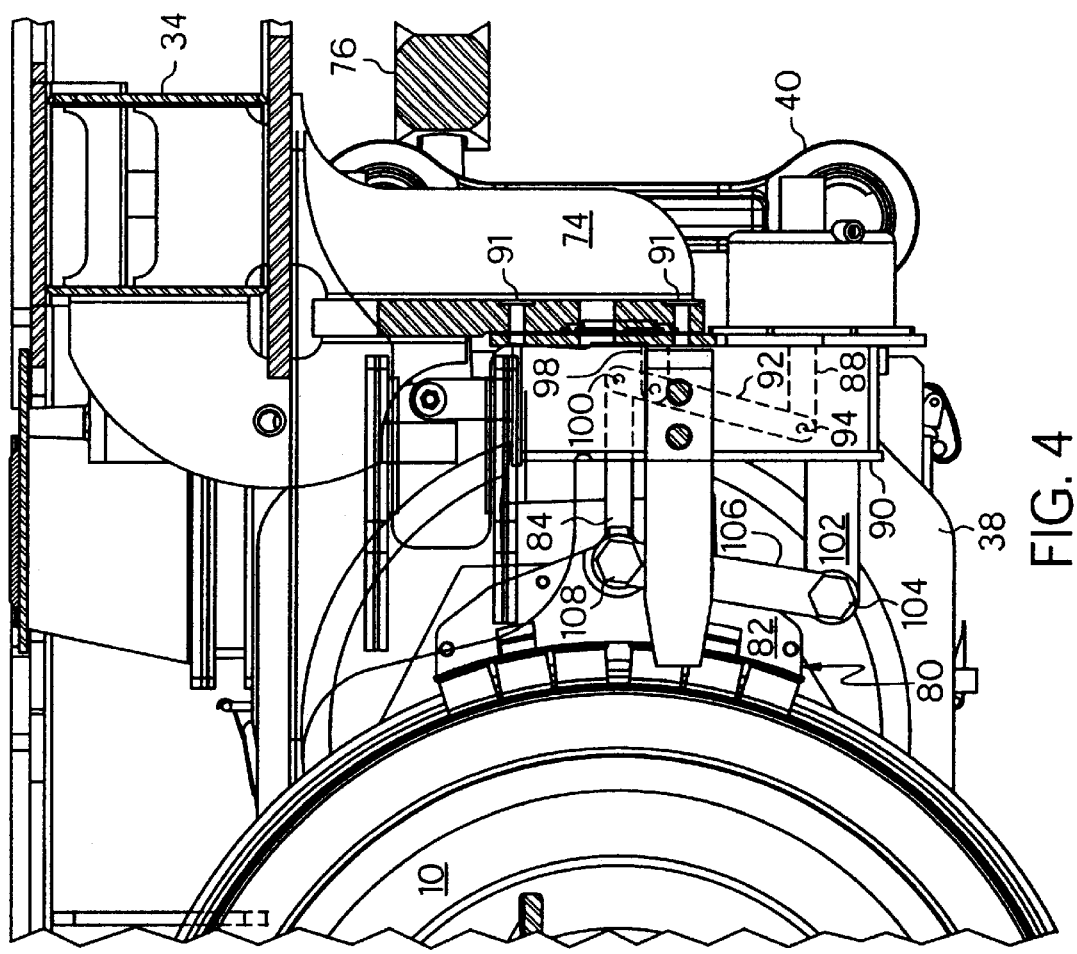
FIG. 4 is a fragmental cross-sectional view taken substantially along line 4—4 of FIG. 2.

Braking action for the bogie 2 is accomplished by mounting on each of the steering beams 46 and 48 for the leading and trailing wheelsets 12 and 16 a unitized brake, indicated generally by 80, for each wheel 10 and 18. In a three-axle arrangement, the unitized brake 80 is also provided to each wheel in the center wheelset 14. As previously mentioned, the unitized brake may be of any conventional type, including those with an integrated slack adjuster, and as best illustrated by FIGS. 3 and 4, generally includes a brake shoe 82, an active lever 84, and a brake cylinder 86 actuated and controlled by a conventional braking system.

The brake cylinder 86 is piston equipped to move piston rod 88 that extends through an internal opening in a housing 90 to apply a braking force to a force multiplying lever 92, to which the piston rod 88 is pivotally connected at 94. In one embodiment, for each wheel, their respective housing 90 is mounted by bolts 91 to the steering beams 46 and 48, which is best illustrated by FIG. 3 for the trailing wheelset 16, which is the same arrangement for leading wheelset 12. In another embodiment, such as in a three-axle embodiment, for each wheel of the center wheelset 14, their respective housing 90 is mounted by bolts 91 to the carbody linkage support 74. In these embodiments, each brake cylinder 86 is mounted to its respective housing 90, such that the unitized brake 80 can be removed or installed without the need to drop its respective wheelset.

The force multiplying lever 92 is pivotally mounted at 96 on a mounting bracket 98 suitably mounted within housing 90. The force multiplying lever 92 is pivotably connected at 100 with the upper portion of the active lever 84 and applies the braking force thereto. For the leading and trailing wheelsets 12 and 16, a hanger bracket 102 is attached to each respective side frame 28 and 30 (FIG. 3), and for embodiments with a center wheelset 14, the hanger bracket 102 may be attached to the lower end of the carbody linkage support 72 (FIG. 4) in one embodiment and to the unitized brake housing 90 in another embodiment. It is to be appreciated, however, that the hanger bracket 102 may be connected to either the bogie frame 2 or the unitized brake housing 90 for any unitized brake 80 of the wheelsets 12, 14, and 16.

In the illustrated embodiments, the hanger bracket 102 pivotably mounts at 104 a hanger 106, which is pivotably connected to brake shoe 82 at 108, to which active lever 84 is also pivotably mounted. In this arrangement, the hanger 106 carries the vertical shoe reaction force; thereby, the respective steering beam is not loaded in torsion. Additionally, since in this brake mounting arrangement the unitized brake 80 will be guided with the wheel, extra clearance for the brake shoe 82 is not required, as is typical for conventional bogie-mounted unitized brake arrangements.

It is to be appreciated that the above-described braking arrangement for the trailing wheelset is also suitable for bogie arrangements having the steering arm located in front of the trailing wheelset. In such an embodiment, the steering arm 48 is rotatably supported either by the above-described post 35 or in any other conventional manner in front of the trailing wheelset 16. The unitized brakes 80 are attached as described above between the steering beam 48 and frame 2. Accordingly, since in this embodiment the braking arrangement for the trailing wheelset 16 differs only with the steering arm 48 and unitized brakes 80 being in front of the wheelset from the illustrated embodiments of FIG. 3, for brevity no further discussion is provided.

In all embodiments, the application of the braking force to the upper end of the active lever 84 by the force multiplying lever 92 being moved in the direction opposite to the movement of the piston rod 88 causes the active lever 84 to pivot about pivot point 104, thereby engaging the brake shoe 82 with its respective wheel served by the unitized brake 80.

These various features provide a railroad vehicle and supporting bogie arrangement having self-steering capability, as described in the previously mentioned application and patents, and with the further benefits of compactness and practicality for multi-axle locomotive trucks, especially those having two or more axles.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A radial bogie for rail vehicles, comprising:
   a frame having longitudinally extending side frames laterally spaced by transoms, said side frames defining a longitudinal axis and having leading and trailing ends;
   leading and trailing wheelsets with axles supported on said frame;
   first and second steering beams pivotably mounted on said frame;
   traction links connected between said wheelsets and said steering beams;
   an inter-axle linkage connected between said steering beams; and
   unitized brakes mounted on said first and second steering beams.

2. The radial bogie of claim 1, further comprising a hanger pivotably connected to said frame, wherein each of said unitized brakes includes an active lever, and a brake shoe pivotably connected to said hanger and said active lever.

3. The radial bogie of claim 1, further comprising a hanger, wherein each of said unitized brakes includes an active lever, a housing accommodating a portion of said active lever, and a brake shoe pivotably connected to said hanger and said active lever, wherein said hanger is also pivotably connected to said housing.

4. The radial bogie of claim 1, wherein said steering beams include crank arms having ends extending in laterally opposite directions, and said inter-axle linkage is connected to said crank arm ends.

5. The radial bogie of claim 1, further comprising a center wheelset with an axle supported on said frame between said leading and trailing wheelsets, said center wheelset being substantially unpivotably mounted on said frame and being movable laterally to said longitudinal axis.

6. The radial bogie of claim 1, wherein each of said axles is selected from the group of a powered axle, and an unpowered axle.

7. The radial bogie of claim 1, wherein said first steering beam is pivotably mounted on said frame behind said leading wheelset away from the leading end of the frame, and said second steering beam being pivotably mounted on said frame behind said trailing wheelset towards the trailing end of said frame.

8. The radial bogie of claim 1, wherein said first steering beam is pivotably mounted on said frame behind said leading wheelset away from the leading end of the frame, and said second steering beam being pivotably mounted on said frame in front of said trailing wheelset.

9. The radial bogie of claim 4, wherein said steering beams further include torque tubes each pivotably mounted on a respective one of said transoms and which extend vertically upward about a pivot axes of a respective one of said steering beams and connect, at their upper ends, with a respective one of said crank arms.

10. The radial bogie of claim 5, wherein said frame further includes side posts, and provided are unitized brakes mounted to said side posts for braking said center wheelset.

11. The radial bogie of claim 5, wherein said frame further includes side posts and provided are brake shoes, hangers pivotably connected between said side posts frame and said brake shoes, and unitized brakes mounted to said side posts and connected to said brake shoes for braking said center wheelset.

12. The radial bogie of claim 5, wherein said frame further includes side posts and provided are brake shoes, hangers pivotably connected to said frame and said brake shoes, and unitized brakes mounted to said side posts and connected to said brake shoes for braking said center wheelset.

13. A radial bogie for rail vehicles, comprising:
a frame having longitudinally extending side frames laterally spaced by transoms, said side frames having side posts and defining a longitudinal axis;
two end wheelsets with axles supported on said frame, said two end wheelsets being pivotably mounted on said frame;
a center wheelset with an axle supported on said frame between said two end wheelsets, said center wheelset being substantially unpivotably connected to said side posts by traction links and being movable laterally to said longitudinal axis;
steering beams for pivotally guiding said end wheelsets, each one of said steering beams being pivotably mounted on said frame behind a respective one of said end wheelsets;
additional traction links connected between said end wheelsets and said steering beams;
an inter-axle linkage connected between said steering beams; and
a first set of unitized brakes mounted to said steering beams.

14. The radial bogie of claim 13, wherein each of said first set of unitized brakes includes an active lever and a brake shoe pivotably connected to a hanger, said active lever being connected to said brake shoe, and said hanger being pivotably connected to said frame.

15. The radial bogie of claim 13, wherein said steering beams include crank arms having ends extending in laterally opposite directions, and said inter-axle linkage is connect to said crank arm ends.

16. The radial bogie of claim 13, further comprising a second set of unitized brakes mounted on said side posts for braking said center wheelset.

17. The radial bogie of claim 13, further comprising a carbody linkage which includes bell cranks pivotably supported on a respective one of said side posts, a cross link pivotably interconnecting first ends of said bell cranks, and side rods connected between a respective one of second ends of said bell cranks and a carbody of the rail vehicle.

18. The radial bogie of claim 13, wherein each of said axles is selected from the group of a powered axle, and an unpowered axle.

19. The radial bogie of claim 13, wherein said steering beams further include torque tubes each pivotably mounted on a respective one of said transoms and which extend vertically upward about a pivot axes of a respective one of said steering beams and connect, at their upper ends, with a respective one of said crank arms.

20. The radial bogie of claim 16, wherein each of said second set of unitized brakes includes an active lever and a brake shoe pivotably connected to a hanger, said active lever being connected to said brake shoe, and said hanger being pivotably connected to a respective one of said side posts.

21. A radial bogie for rail vehicles, comprising:
a frame having side posts, a leading end, and defining a longitudinal axis;
first, second, and third wheelsets having axles being elastically supported on said frame;
a pair of steering beams, one each located behind said first and third wheelsets away from said leading end of said frame and mounting a first set of unitized brakes;
a second set of unitized brakes for braking said second wheelset;
traction links coupling said first and third wheelsets to said steering beams, and said second wheelset to said side posts; and
an inter-axle link coupling rotary motions about vertical axes of said steering beams to provide opposite transverse movement of said first and third wheelsets upon traversing curves, wherein each of said first set of unitized brakes includes an active lever and a brake shoe pivotably connected to a hanger, said active lever being connected to said brake shoe, and said hanger being pivotably connected to said frame, and wherein each of said second set of unitized brakes includes an active lever and a brake shoe pivotably connected to a hanger, said active lever being connected to said brake shoe, and said hanger being pivotably connected to a respective one of said side posts.

22. The radial bogie of claim 21, further comprising a carbody linkage rotatably connecting said frame to a carbody of the rail vehicle.

23. The radial bogie of claim 22, wherein carbody linkage includes bell cranks pivotably supported on a respective one of said side posts, a cross link pivotably interconnecting first ends of said bell cranks, and side rods connected between a respective one of second ends of said bell cranks and said carbody of the rail vehicle.

24. A railroad locomotive of the type comprising a carbody supported by at least one self steering radial bogie having a frame having longitudinally extending side frames laterally spaced by transoms, said side frames defining a longitudinal axis and having leading and trailing ends; leading and trailing driven wheelsets with axles supported on said frame; first and second steering beams for pivotally guiding said wheelsets, said first steering beam being pivotably mounted on said frame behind said leading wheelset away from the leading end of the frame, and said second steering beam being pivotably mounted on said frame behind said trailing wheelset towards the trailing end of said frame; traction links connected between said wheelsets and said steering beams; an inter-axle linkage connected between said steering beams; and unitized brakes mounted on said steering beams.

25. The railroad locomotive of claim 24, wherein said steering beams include crank arms having ends extending in laterally opposite directions, and said inter-axle linkage is connect to said crank arm ends.

26. The railroad locomotive of claim 24, further comprising a center wheelset with an axle supported on said frame between said leading and trailing wheelsets, said center wheelset being substantially unpivotably mounted on said frame and being movable laterally to said longitudinal axis.

27. The railroad locomotive of claim 24, wherein each of said unitized brakes includes an active lever and a brake shoe pivotably connected to a hanger, said active lever being connected to said brake shoe, and said hanger being pivotably connected to said frame.

28. The railroad locomotive of claim 24, wherein said frame further includes side posts, and provided is a carbody linkage which includes bell cranks pivotably supported on a respective one of said side posts, a cross link pivotably interconnecting first ends of said bell cranks, and side rods connected between a respective one of second ends of said bell cranks and the carbody.

29. The railroad locomotive of claim 25, wherein said steering beams further include torque tubes each pivotably mounted on a respective one of said transoms and which extend vertically upward about a pivot axes of a respective one of said steering beams and connect, at their upper ends, with a respective one of said crank arms.

30. The railroad locomotive of claim 26, wherein said frame further includes side posts, and provided are additional unitized brakes mounted on said side posts for braking said center wheelset, and additional traction links connecting said center wheelset to said side posts, wherein each of said unitized brakes includes an active lever and a brake shoe pivotably connected to a hanger, said active lever being connected to said brake shoe, and said hanger being pivotably connected to said frame.

31. Running gear for rail vehicles comprising at least one bogie having a frame having longitudinally extending side frames laterally spaced by transoms, said side frames defining a longitudinal axis and having leading and trailing ends; leading and trailing wheelsets with axles supported on said frame; first and second steering beams for pivotally guiding said wheelsets, said first steering beam being pivotally mounted on said frame behind said leading wheelset away from the leading end of the frame, and said second steering beam being pivotally mounted on said frame behind said trailing wheelset towards the trailing end of said frame; traction links connected between said wheelsets and said steering beams; an inter-axle linkage connected between said steering beams; and unitized brakes mounted on said steering beams.

* * * * *